No. 619,656. Patented Feb. 14, 1899.
J. W. BAIRD.
CYCLE.
(Application filed Dec. 14, 1897.)
(No Model.)
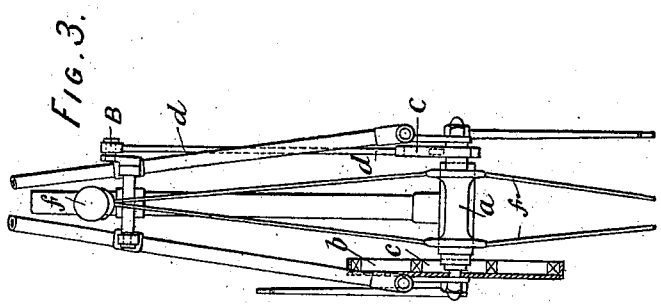
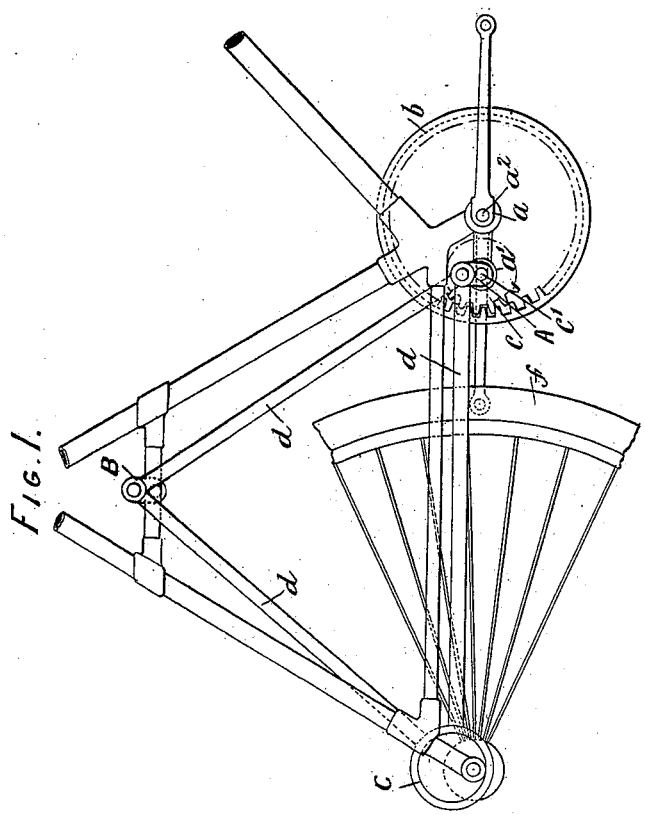
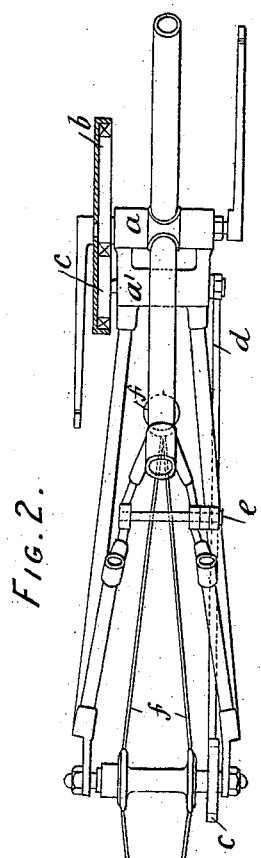
WITNESSES:
F. W. Wright.
S. C. Connor.
INVENTOR
JOHN W. BAIRD
BY
Horsman and Hony
HIS ATTORNEYS

UNITED STATES PATENT OFFICE.

JOHN W. BAIRD, OF PORTOBELLO, SCOTLAND.

CYCLE.

SPECIFICATION forming part of Letters Patent No. 619,656, dated February 14, 1899.

Application filed December 14, 1897. Serial No. 661,788. (No model.)

*To all whom it may concern:*

Be it known that I, JOHN W. BAIRD, a subject of the Queen of Great Britain and Ireland, and a resident of Portobello, county of Mid-Lothian, Scotland, have invented certain new and useful Improvements in Cycles, (for which I have obtained a patent in Great Britain, No. 28,641, bearing date December 15, 1896,) of which the following is a specification.

My improved cycle driving-gear comprises an improved combination of coupling-rod and cranks or eccentrics for transmitting motion from the crank or other driving shaft to the wheel or wheels.

The coupling-rod is fitted to three or more cranks or eccentrics. Preferably the rod is coupled to three cranks. The centers of two of these cranks are in line with each other. The third crank, with its shaft, is placed midway or otherwise suitably placed between the other two cranks, but not in line with them, being placed to one side. The bearings of the shafts to which the rod is coupled by means of the cranks or eccentrics run in suitable journals, either ball or plain. The form of the coupling-rod is triangular, with a crank or eccentric coupled by means of suitable bearings to each corner of the triangle. With this arrangement of three-cranked coupling-rod there are no dead-centers. When any one of the three shafts to which the cranks or eccentrics are attached is made to revolve, the other two shafts simultaneously rotate in the same direction. Supposing two of the cranks are on their dead-centers, the third crank is not then on its dead-center, but is free to lift the rod laterally, and simultaneously the other two cranks are taken over their dead-centers.

In the accompanying drawings, Figure 1 is a side elevation, Fig. 2 a plan view, and Fig. 3 an end view, broken away, showing my improvements as applied to a safety-bicycle.

Referring to the drawings, $a$ $a'$ is a double-barreled crank-bracket. The pedal crank-axle $a^2$ is carried in the bracket $a$. At one end of the axle $a^2$ is keyed an internally-toothed wheel $b$. The other bracket $a'$ carries a shaft $e'$, at one end of which is keyed the externally-toothed pinion $e$. This pinion $e$ gears with the internally-toothed wheel $b$. At the other end of this shaft $e'$ is a crank or eccentric A. By means of suitable bearings this crank or eccentric A is coupled to the triangular coupling-rod $d$ $d$ $d$. The middle or controlling crank B is mounted in a suitable part of the frame of the cycle and is coupled to the triangular coupling-rod $d$ with either a crank or eccentric, such connection being above the points of connection of the coupling-rod with the wheel and shaft. As shown, the triangular coupling-rod is coupled to the driving-wheel $f$ by means of an eccentric C; but the driving-wheel may be connected to the coupling-rod by means of a crank, and so connected the bearings of the driving-wheel will require to be attached to the framing of the cycle. To diminish friction, the eccentric C, shown in the drawings at the right side of driving-wheel $f$, is fitted with ball-bearings placed in a groove partly formed in the eccentric-pulley and the eccentric-straps. I use the internally-toothed wheel and externally-toothed pinion for speeding up the cycle; but other gearing may be used, such as three spur-pinions or the sun-and-planet gearing.

I claim as my invention—

A cycle having a crank-shaft and a driven wheel with a frame in which the same are mounted, a triangular coupling-rod between the crank-shaft and the wheel, a crank or eccentric at each corner of said triangular coupling, the said cranks or eccentrics severally serving to connect the coupling to the crank-shaft, frame and wheel the connection with the frame being above the connections with the shaft and wheel, all substantially as and for the purpose described.

In testimony whereof I have signed my name to this specification in the presence of two subscribing witnesses.

J. W. BAIRD.

Witnesses:
   F. W. FRIGOUT,
   ALFRED NUTTING.